United States Patent Office 2,958,602
Patented Nov. 1, 1960

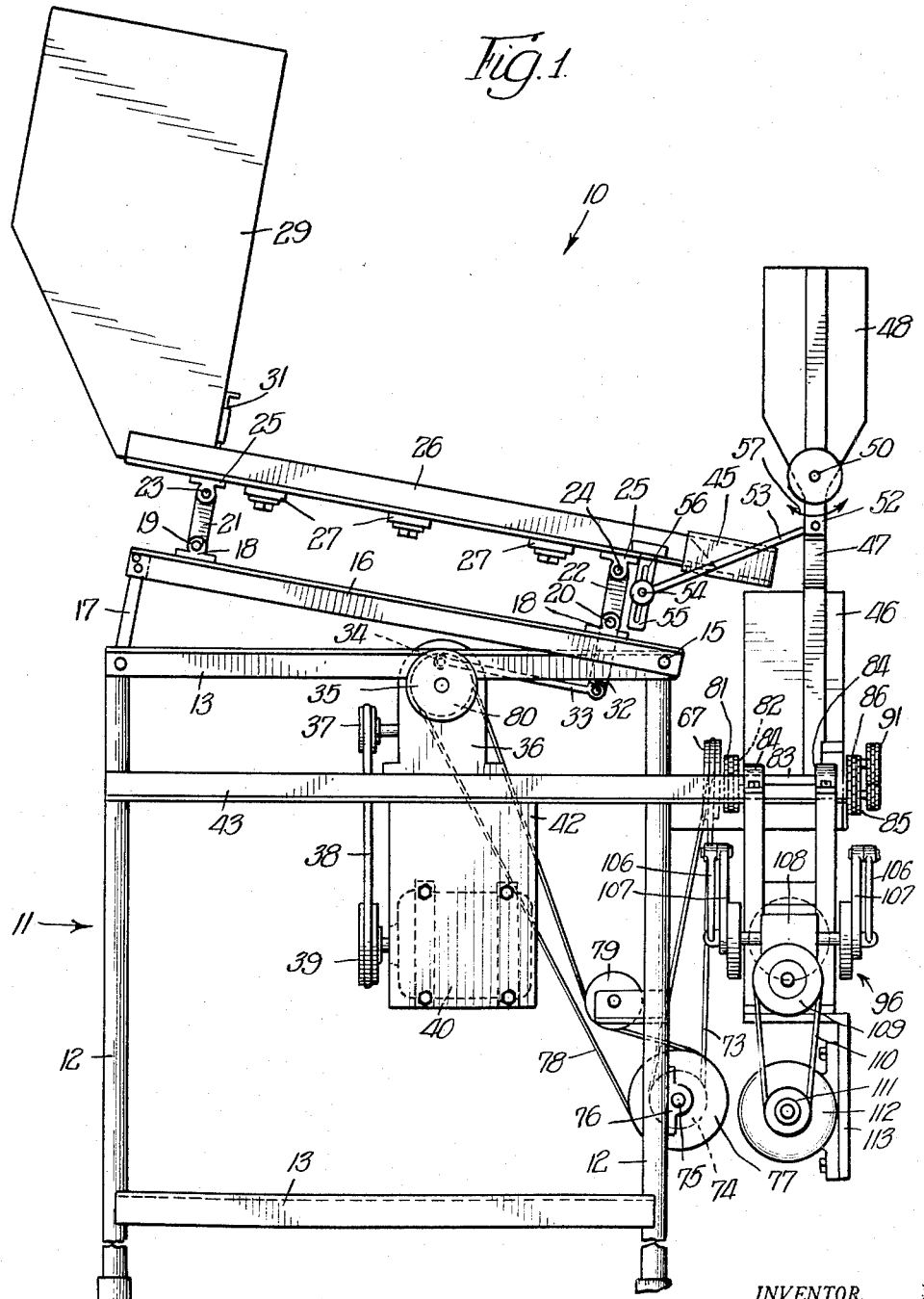

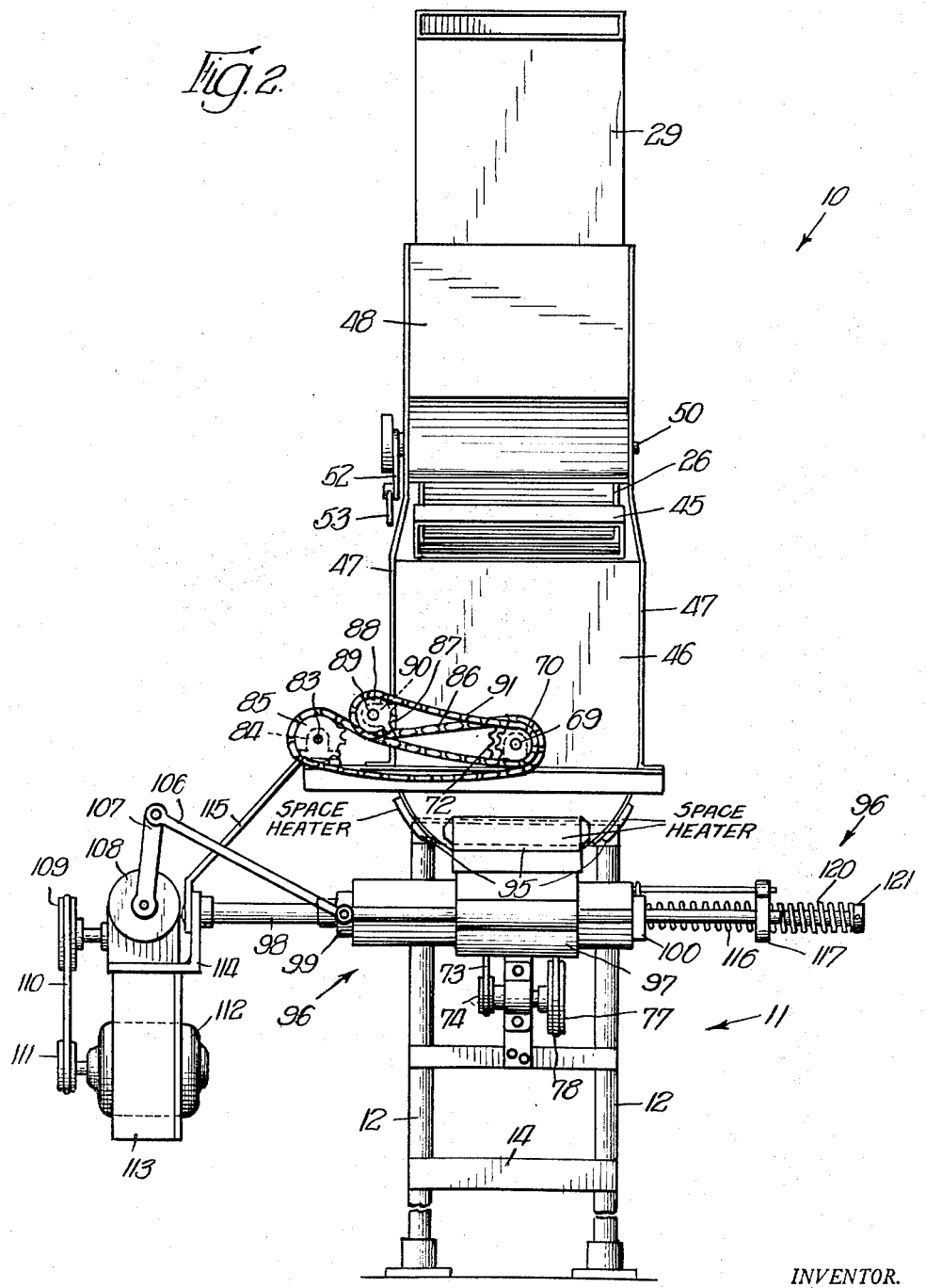

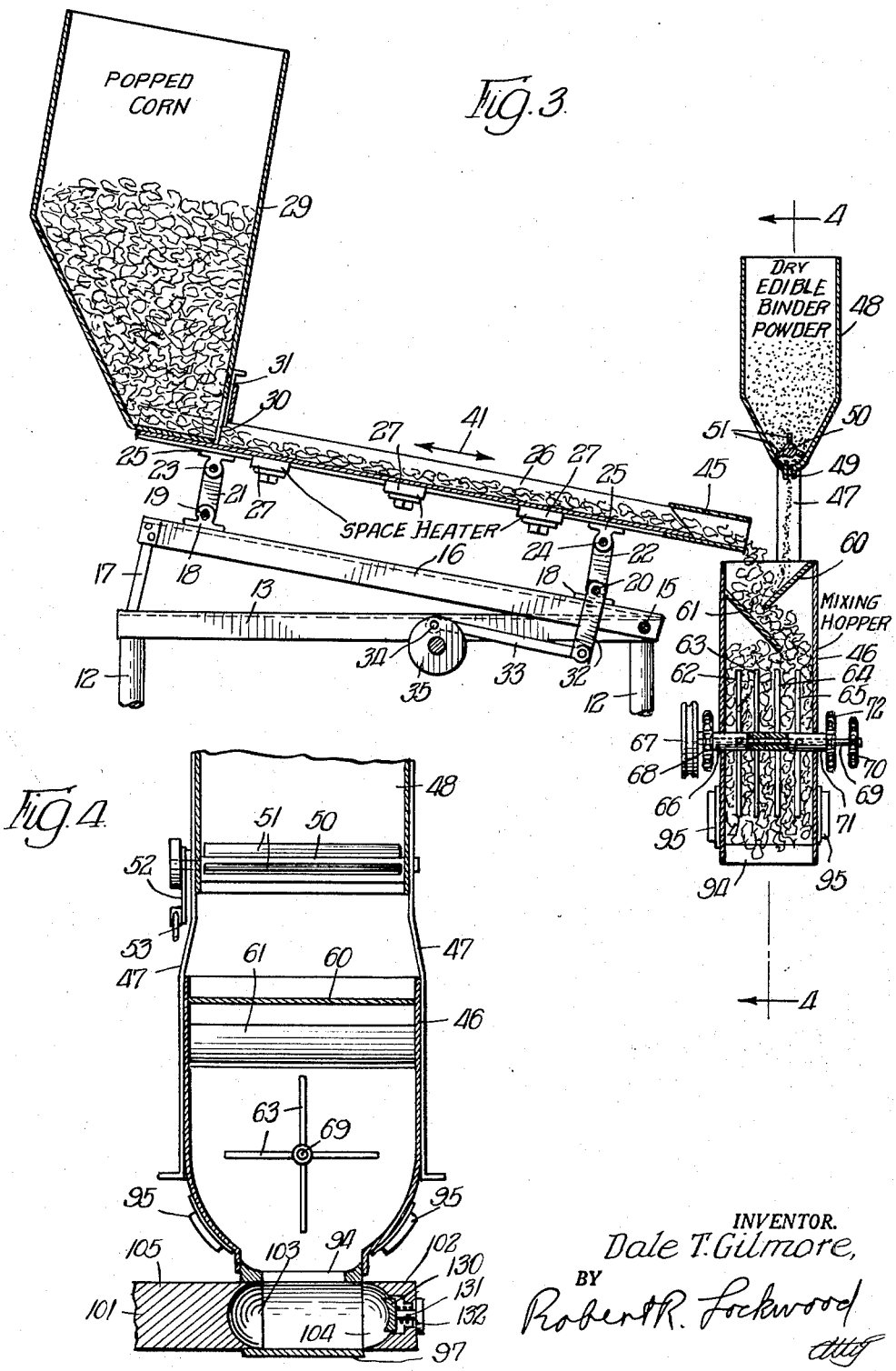

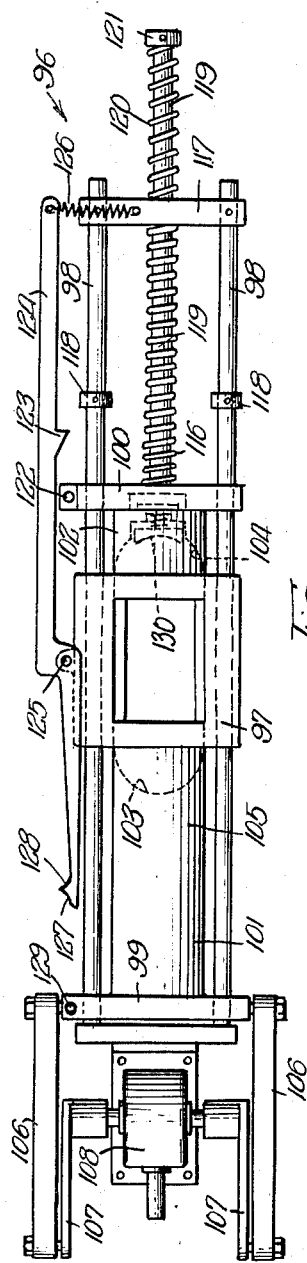
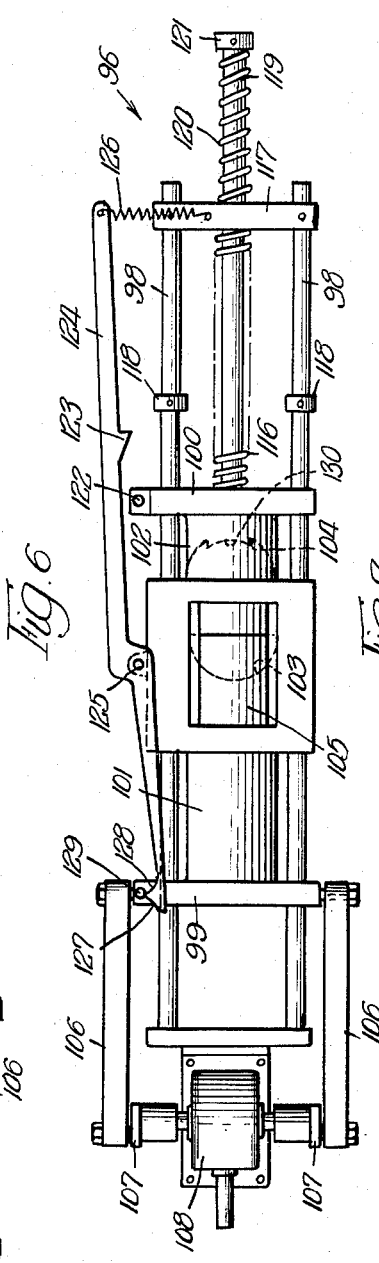
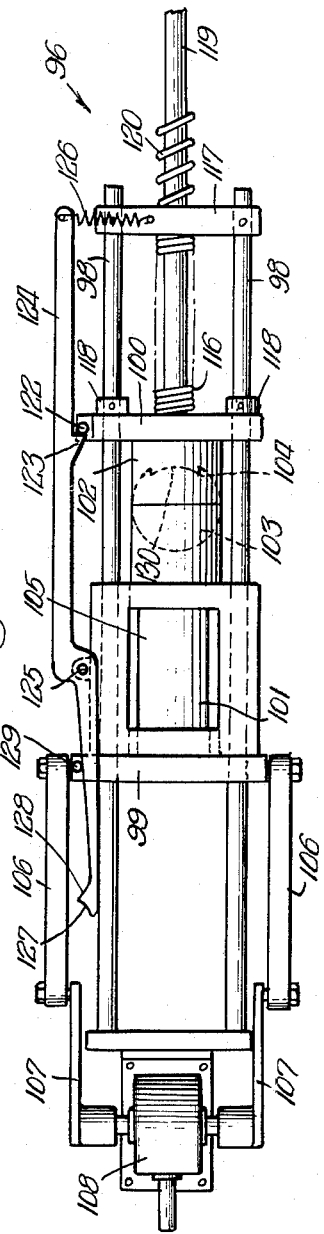

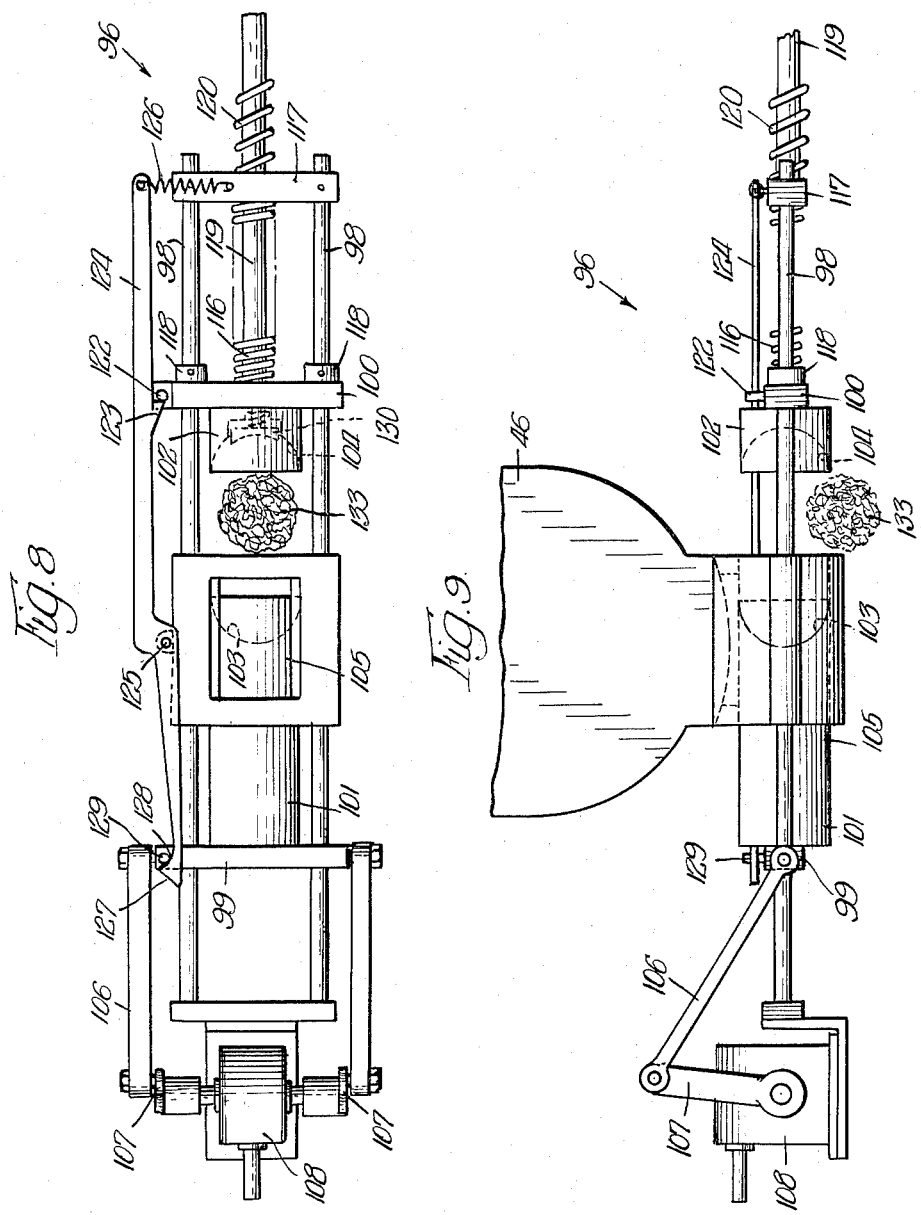

2,958,602

CONTINUOUS METHOD OF MAKING POPPED CORN BALLS

Dale Thomas Gilmore, Springdale, Ark., assignor, by mesne assignments, to Sonneman Products, Incorporated, Fayetteville, Ark., a corporation of Arkansas Filed Aug. 13, 1956, Ser. No. 603,615

3 Claims. (Cl. 99—80)

This invention relates, generally, to machines for forming objects and it has particular relation to machines for making popped corn balls and the like.

Among the objects of this invention are: To provide a machine for making objects, such as popped corn balls, that is simple and efficient in operation and which can be readily and economically manufactured, installed, and operated; to mix popped corn and an edible binder in such manner that the mixture has little tendency to stick to the walls of the hopper in which the same are mixed or to the dies used for compressing the mixture to the desired shape; to provide a heated space in which the mixing is performed; to feed independently popped corn and a dry edible powdered binder into a mixing hopper; to heat the popped corn before it is fed into the mixing hopper; to form the popped corn coated with the binder as the result of the mixing operation by a continuously operating mechanism into the desired shape, such as balls; and to provide a dry edible binder in a powdered form for holding together kernels of popped corn and the like by cooking the ingredients, allowing them to cool and solidify, and pulverizing the solid material.

Other objects of this invention will, in part, be obvious and in part appear hereinafter.

This invention is disclosed in the embodiment thereof shown in the accompanying drawings and it comprises the features of construction, combination of elements, method of operation, and method of manufacture which will be exemplified by the construction hereinafter set forth and the scope of the application of which will be indicated in the appended claims.

For a more complete understanding of the nature and scope of this invention, reference can be had to the following detailed description, taken together with the accompanying drawings, in which:

Figure 1 is a view, in side elevation, of a popped corn ball making machine in which the present invention is embodied;

Figure 2 is a view, in end elevation, of the machine as shown in Figure 1;

Figure 3 is a vertical sectional view through the machine illustrated in Figures 1 and 2, only the hoppers and associated parts being shown;

Figure 4 is a vertical sectional view taken generally along the line 4—4 of Figure 3;

Figure 5 is a top plan view of the popped corn ball forming mechanism, the dies being shown in the full open position;

Figure 6 is a view, similar to Figure 5, but showing one of the dies moving to cut off the discharge from the mixing hopper and to compress the coated popped corn kernels between it and the other die;

Figure 7 is a view, similar to Figure 6, but showing the dies in their fully extended position with the popped corn ball fully formed and held therebetween;

Figure 8 is a view, similar to Figure 7, showing one of the dies being held while the other die is moved away therefrom to permit the fully formed popped corn ball to be discharged downwardly; and Figure 9 is a view, in side elevation, of the popped corn ball forming mechanism as shown in Figure 8.

Referring now particularly to Figures 1, 2 and 3 of the drawings, it will be observed that the reference character 10 designates, generally, a popped corn ball making machine in which the present invention is embodied. The machine includes a support frame 11 that may be formed of upright members 12 in the form of pipes. Longitudinal angle braces 13 are suitably secured by welding at their ends to the uprights 12 and in like manner transverse angle braces 14 are provided, only one being shown in Figure 2. It will be understood that the support frame 11 can take many forms and that the one illustrated is typical of those which can be employed.

Pivoted at 15 to the upper longitudinal braces 13 and at one end is a pair of support angles 16 which are inclined at a slight angle to the longitudinal braces 13 and held in the inclined position by a pair of adjustable brackets 17. Provision is made for adjusting the inclination of the support angles 16 to an angle from zero to about twenty degrees. Bearings 18 are mounted on the upper sides of the support angles 16 near the ends and shafts 19 and 20 are journaled therein. Fastened to the shafts 19 and 20 are pairs of links 21 and 22 which are fastened at their upper ends to shafts 23 and 24 that are journaled in bearings 25 carried by the underside of a chute 26. As will be described hereinafter, the chute 26 is provided for directing the flow of popped corn to be further processed and it, like the support angle 16, is inclined to the horizontal in order to facilitate the flow of the popped corn therethrough.

It is desirable to heat the space within the chute 26 in order that the popped corn will be raised to an elevated temperature for further processing. For this purpose space heaters 27 are provided on the underside of the chute 26 and they are connected to a suitable source of electric current (not shown) to maintain the interior of the chute 26 at the desired temperature as will be understood readily.

The popped corn to be processed is deposited in a popped corn hopper 29 which is mounted at one end of the inclined chute 26 and is provided with an opening 30 that is arranged to be closed by a gate 31. It will be understood that the popped corn in the hopper 29 flows through the opening 30 when the gate 31 is opened, as shown in Figure 3, into the chute 26 where it is heated by the space heaters 27 as it flows downwardly therethrough.

It is desirable to further facilitate the flow of the popped corn through the chute 26 by vibrating or oscillating it together with the popped corn hopper 29. For this purpose an arm 32 is fastened to the shaft 20 and its lower end is connected by a link 33 to a pin 34 which is carried eccentrically by a wheel 35. The wheel 35 is driven through a gear reducer 36, Figure 1, by means of a pulley 37. A belt 38 extends over the pulley 37 and also over a drive pulley 39 of a motor 40. Thus, when the motor 40 is operating, the wheel 35 is rotated and the chute 26 and hopper 29 are oscillated as indicated at 41 in Figure 3 through an extent which may be of an order of 1½" and at a rate of the order of 90 to 160 oscillations per minute.

The motor 40 is suitably mounted on the frame 11. For example, it can be mounted on a vertical support plate 42 which is fastened to one of a pair of longitudinal frame angles 43 which extend between the uprights 12 and project beyond one side of the frame 11 for supporting additional parts of the mechanism that will be described hereinafter.

At the right hand end of the chute 26 a spout 45 is provided for directing the flow of the heated popped corn into a mixing hopper 46 which is carried by the extensions of the frame angles 43 as seen more clearly in Figure 1. Extending upwardly along the sides of the mixing hopper 46 and supported by the extensions of the frame angles 43 is a pair of straps 47 which carry at their upper ends an edible powdered binder hopper 48 which is provided with an opening 49 at the bottom through which the binder can flow into the mixing hopper 46 therebelow simultaneously with the flow of popped corn. The details of the composition of the binder powder and the method of making it will be set forth hereinafter.

It is desirable that the flow of the binder powder from the hopper 48 be uniform and continuous. For this purpose an agitator is employed which includes a shaft 50 that is rockably mounted at its ends in suitable bearings carried by the side walls of the hopper 48 and from which blades 51 project radially for stirring continuously the binder powder at the bottom of the hopper 48. Provision is made for rocking the shaft 50 through the agency of an arm 52 which is carried at one end and is connected by a link 53 to a clamp screw 54 that is adjustably secured to an arm 55 which projects downwardly from and moves with the chute 26. A slot 56 is provided in the arm 55 for receiving the clamp screw 54.

Now it will be apparent that, when the chute 26 is oscillated in the manner previously described, the arm 55 will be similarly moved and through the link 53, the arm 52 will be rocked as indicated at 57 in Figure 1 to rock the shaft 50 and effect corresponding movement of the blades 51.

It is desirable that the popped corn and the binder powder be thoroughly mixed in the mixing hopper 46 so that the former will be thoroughly coated by the latter. However, it is desirable that the binder powder be such that the kernels of popped corn, when coated thereby, will not stick to the interior walls of the mixing hopper 46 or to the parts employed for forming the kernels itno shapes such as balls. This result is obtained through the use of the particular binder powder to be described hereinafter.

As shown in Figure 3 of the drawings, the popped corn and the binder powder flow simultaneously into the mixing hopper 46 and the flow thereof is directed by baffles 60 and 61. In addition, agitators 62, 63, 64 and 65 are provided for thoroughly intermixing the binder powder and the popped corn. These agitators are in the form of rods, shown more clearly in Figure 4, and provision is made for driving the outer agitators 62 and 65 in one direction and the inner agitators 63 and 64 in the opposite direction in order to effect a thorough coating of the popped corn kernels by the binder powder. Any suitable mechanical arrangement can be employed for effecting such a drive.

In accordance with this invention the agitators 62–65 are driven by the motor 40. For this purpose the rods forming the agitators 62 extend radially from a hollow shaft which is suitably rotatably mounted at one side of the mixing hopper 46 and is provided with a pulley 67 and a sprocket 68 fast thereon. Within the hollow shaft 66 is a shaft 69 which extends through the opposite side of the mixing hopper 46 and has fast thereon the agitators 63 and 64. At its outer end the shaft 69 carries a sprocket 70. The shaft 69 extends through a hollow shaft 71 which is journaled by suitable means on the side wall of the mixing hopper 46 opposite that where the hollow shaft 66 is journaled and it carries the rods comprising the agitator 65. At its outer end the hollow shaft 71 is provided with a sprocket 72.

Provision is made for driving the agitators 62–65 through the agency of a belt 73 which extends over the pulley 67 and also over a pulley 74 which is fast on a shaft 75 that is journaled in a bearing 76 carried by one of the uprights 12 as shown more clearly in Figure 1. Fast on the shaft 75 is a pulley 77 over which a belt 78 extends underneath an idler pulley 79. The belt 78 is driven by a pulley 80 which is mounted on the gear reducer 36 on the side opposite the pulley 35. Thus, when the motor 40 is operating the pulley 67 is rotated through the drive linkage just described.

A chain 81 is trained over the sprocket 68 and also over a sprocket 82, Figure 1, which is fast on one end of a jack shaft 83 that is journaled in bearings 84. At the other end of the jack shaft 83 is a sprocket 85 over which a chain 86 is trained and it also is trained over the sprocket 72. Thus, when the pulley 67 is rotated, the agitators 62 and 65 are rotated in the same direction. As shown in Figure 2 the chain 86 is trained underneath a sprocket 87 which, together with a sprocket 88, is fast on a shaft 89 that is journaled in a bearing 90 which is mounted on one of the support straps 47. A chain 91 is trained over the sprocket 88 and also the sprocket 70 so that, the agitators 63 and 64 are rotated in a direction opposite to the direction in which the agitators 62 and 65 are rotated.

As shown in Figure 4, the mixing hopper 46 is provided with a discharge opening 94 at the bottom so that the popped corn thoroughly coated with the binder powder can be discharged downwardly therefrom under the influence of gravity. It is desirable that the interior of the mixing hopper 46 be maintained at an elevated temperature whereby the binder is rendered sufficiently tacky to cause the kernels of popped corn to adhere when subjected to pressure but insufficient to cause them to adhere to the walls of the hopper 46 to any substantial extent. It will be recalled that the popped corn is delivered to the mixing hopper 46 from the chute 26 at an elevated temperature because of the provision of the space heaters 27. The popped corn is maintained at the elevated temperature by means of space heaters 95 that are applied to the outer walls of the mixing hopper 46 on the four sides near the bottom. The space heaters 95, like the space heaters 27, are connected to a suitable source of electric current (not shown) and the current flow therethrough is adjusted to provide the desired operating conditions. It will be understood, of course, that other heating means can be employed, if desired.

Below the discharge opening 94 there is positioned a popped corn ball forming mechanism which is shown, generally, at 96. While a mechanism for forming the coated popped corn into balls is described, it will be understood that other mechanisms can be employed and that other shapes can be formed. For example, the coated popped corn can be formed into cylindrical shapes or rectangular shapes or it can be formed into objects simulating animals, people, birds, trees, etc. The term "popped corn balls" as used herein and in the appended claims is intended to refer not only to ball shapes but also to these other shapes.

The popped corn ball forming mechanism 96 is illustrated in more detail in Figures 5–9 of the drawings to which reference now will be had. This mechanism includes a receiver 97 which is carried by the extensions of the frame angles 43 and is positioned directly underneath the discharge opening 94 of the mixing hopper 46. On opposite sides of the receiver 97 are guide rods 98 which are stationarily mounted and extend horizontally. Slidably mounted on the stationary guide rods 98 are cross heads 99 and 100 carrying forming dies 101 and 102 which extend toward each other. As shown in Figure 4, the forming die 102 is arranged to be positioned at one end of a cylindrical opening extending horizontally through the receiver 97 while the forming die 101 is arranged to extend into and through this cylindrical opening as it is moved to effect the forming operation to be described presently. The opposing ends of the forming dies 101 and 102 are provided with hemispherical cavities 103 and 104 when it is desired to form the coated popped corn into balls. However, other shapes of cavities can be employed where it is desired to form other shapes of objects. The intermediate portion 105 of the forming die 101, which is substantially longer than the forming die 102, functions as a valve to close off the discharge opening 94 of the mixing hopper 46 during the formation of a ball.

The forming die 102 is moved through the agency of the forming die 101. To the cross head 99 of the latter are connected connecting rods 106. The opposite ends of these rods 106 are connected to eccentric arms 107 that are arranged to be rotated through a gear reducer 108 that is driven by a pulley 109, Figure 2. A belt 110 interconnects the pulley 109 and a pulley 111 driven by an electric motor 112. The motor 112 is carried by a support plate 113 which depends from a support angle 114 which is located at one end of the guide rods 98 and is further supported by a brace 115.

As the forming die 101 moves to the right, as viewed in Figure 5, it causes the forming die 102 to move in the same direction against the biasing action of a coil compression spring 116 which is positioned between a cross member 117 at the right hand end of the guide rods 98 and the cross head 100. The movement of the cross head 100 to the right is limited by adjustable stops 118 in the form of collars that can be positioned as desired along the guide rods 98. The coil compression spring 116 is positioned around a rod 119 which is secured at one end to the cross head 100 and extends through the cross member 117 and beyond it for receiving a buffer spring 120. A collar 121 is secured to the outer end of the rod 119 for containing the buffer spring 120. It will be understood that the spring 120 is employed to reduce the shock incident to the return of the forming die 102 to the position shown in Figure 4 where it closes off one end of the horizontal opening through the receiver 97.

With a view to holding the forming die 102 in the open position to permit the formed object to be ejected therefrom, a pin 122 is positioned at one end of the cross head 100 and projects upwardly therefrom. The pin 122 is arranged to be engaged by a tooth 123 to hold the cross head 100 and the forming die 102 in the extended position. The tooth 123 is carried by a control lever 124 which is pivoted intermediate its ends at 125 on the receiver 97. A coil tension spring 126 which is strained between the right hand end of the lever 124 and an anchor on the cross member 117 serves to bias the tooth 123 into the path of movement of the pin 122. At the other end of the control lever 124 cam faces 127 and 128 are provided which are arranged to be engaged by a trip release pin 129 that extends upwardly from the cross head 99 and is movable therewith. Thus, as the cross head 99 is moved to the right, the trip release pin 129 engages the cam face 127 and shifts the control lever 124. On its return stroke, it engages the cam face 128 and effects a similar movement, this time moving the tooth 123 out of restraining engagement with the pin 122 and permittting the spring 116 to return the forming die 102 to the initial position.

It is desirable that means be provided for ejecting automatically the formed ball from the forming die 102. For this purpose, as shown in Figure 4, a ball ejector plate 130 is provided the surface of which conforms to the spherical surface of the cavity 104. The plate 130 is carried by a stem 131 which is slidably mounted in the forming die 102. A coil compression spring 132, surrounding the stem 131, functions to bias the plate 130 outwardly so that, when the pressure is relieved on the ball after the forming operation has been completed, the movement of the plate 130 outwardly is permitted and the ball is ejected.

It has been pointed out hereinbefore that provision is made for coating the heated popped corn with a dry edible binder in a powdered form. This makes it possible to form the popped corn balls or other objects as a continuous process rather than to employ a batch process which is employed when the popped corn is mixed with a binder in liquid or syrup form.

In accordance with this invention the binder powder is formed first as a syrup. Then it is cooked, cooled and allowed to harden. The solid form is then pulverized to provide the binder powder.

Typical ingredients for the syrup are as set forth below in the proportions indicated:

1# corn syrup
½# granulated sugar
1 ounce butter or margarine
1 T. vinegar

These ingredients are mixed and heated to a temperature in the range of 290° to 300° F. and are cooked at this temperature to thoroughly blend them. Then the cooked material is allowed to cool and solidify into slabs or blocks. Next the solid material is pulverized to a fine size such as the size of flour, preferably in a refrigerated dry room. Unless the powder is to be used immediately, it is sealed in suitable containers to prevent contact with the air.

A substantial amount of the dry edible binder is placed in the binder hopper 48 to carry out the coating process.

In describing the operation of the popped corn ball making machine 10, it will be assumed that both of the motors 40 and 112 are operating and that the space heaters 27 and 95 are energized. Further, it will be assumed that the popped corn hopper 29 is filled with popped corn and that the hopper 48 is filled with the dry edible binder powder manufactured in the manner above described of the ingredients above set forth.

Under these operating conditions the chute 26 and hopper 29 are oscillated so that the popped corn moves downwardly therethrough from the hopper 29 through the heated space in the chute 26 to the mixing hopper 46. At the same time the binder powder drops through the opening 49 simultaneously with the flow of popped corn into the mixing hopper 46. The agitators 62–65 are rotating in the directions indicated to thoroughly mix the popped corn with the binder powder to the end that the former will be throughly coated by the latter. This is accomplished in the heated space within the mixing hopper 46.

The coated popped corn falls through the opening 94 at the bottom of the mixing hopper 46 into the space between the cavities 103 and 104 in the dies 101 and 102 positioned as shown in Figure 4 and also in Figure 5. As the forming die 101 moves to the right, as shown in Figure 6, the intermediate portion 105 closes off the opening 94 and the coated popped corn between the dies 101 and 102 is compressed since the die 102 is held against movement to the right by the coil compression spring 116. As the trip release pin 129 engages the cam face 127, the control lever 124 is rocked to the position shown in Figure 6. However, no other function is performed by the trip release pin 129 at this time.

The continued movement of the forming die 101 to the right as shown in Figure 7, causes the intermediate portion 105 to close off completely the discharge opening 94 at the bottom of the mixing hopper 46. At the same time the right hand end picks up the left hand end of the forming die 102 and moves it to the right against the action of the spring 116. In the meantime, the trip release pin 129 has moved past the cam face 127 and the control lever 124 has been returned by the spring 126 to its normal position. As the pin 122 on the cross head 100 moves past the inclined portion of the tooth 123, it swings the control lever 124 outwardly until it reaches the end of the inclined portion whereupon the spring 126 swings the control lever 124 to the position shown in Figure 7 where the tooth 123 engages the pin 122 and holds the cross head 100 and the forming die 101 against the action of the spring 116. During the final movement of the dies 101 and 102 to the right, the coated popped corn between them is compressed into a ball, as indicated in Figures 8 and 9 of the drawings, at 133. The stops 118 limit the movement of the cross head 100 and forming die 102 to the right and thus permit the necessary pressure to be applied to form the ball 133.

Figure 7 shows the extreme position of the forming die 101 in its forward movement. Continued rotation of the eccentric arms 107 then causes the cross head 99 and forming die 101 to move to the left. The result, as shown in Figure 8, is that the dies 101 and 102 are separated, the latter being held in the extended position through the interaction of the pin 122 and the tooth 123. Intermediate the return stroke of the forming die 101, the pin 129 engages the cam face 128 and as the pin 129 continues to move to the left, the operating lever 124 is swung to the position shown in Figure 6 where the tooth 123 is moved out of engagement with the pin 122. This releases the spring 116 and permits it to bias the cross head 100 and forming die 102 back to the initial position shown in Figure 4. Just prior to this return movement of the forming die 102 the formed popped corn ball 133 is ejected by the ball ejector plate 130 and it moves downwardly from between the dies 101 and 102 as shown in Figure 9 to a suitable receptacle.

As the cross head 100 and forming die 102 approach the initial position, the buffer spring 120 comes into play and cushions the arresting of the forming die 102.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A process of making popped corn balls which comprises, cooking major amounts of corn syrup and granulated sugar and minor amounts of shortening and flavoring to thoroughly blend the same, cooling the resulting blended mass to solidify the same, pulverizing the solidified mass to form a syrup base edible binder in finely divided dry powder form, simultaneously feeding a stream of dry popped corn kernels and a stream of said powdered binder into a mixing chamber heated to a temperature whereat said dry binder is rendered sufficiently tacky to cause the kernels of popped corn to adhere when subjected to pressure but insufficient to cause them to adhere to the walls of said chamber to any substantial extent, uniformly mixing said kernels of popped corn and said dry powdered binder in said heated mixing chamber, removing said heated admixture from said heated mixing chamber at a rate sufficient to equal the feeding rate thereinto, and promptly subjecting separate quantities of said removed heated admixture to pressure to form the same into popped corn balls.

2. The process of claim 1 wherein said pulverizing step is carried out in a refrigerated atmosphere.

3. The process of claim 1 wherein said stream of popped corn kernels is preheated.

References Cited in the file of this patent

UNITED STATES PATENTS

| | | |
|---|---|---|
| 475,840 | Woods | May 31, 1892 |
| 897,682 | Turnbull | Sept. 1, 1908 |
| 1,526,746 | Friedman | Feb. 17, 1926 |
| 1,757,234 | Carson | May 6, 1930 |
| 1,879,927 | Eakins | Sept. 27, 1932 |
| 2,451,096 | Kooman | Oct. 12, 1948 |
| 2,518,247 | Nairn | Aug. 8, 1950 |
| 2,556,611 | Sargent | June 5, 1951 |
| 2,614,044 | Smith | Oct. 14, 1952 |

OTHER REFERENCES

How to Make Candy, by W. W. Chenoweth, 1936, published by the Macmillan Company, pp. 151 and 152.